(12) United States Patent
Murphy et al.

(10) Patent No.: US 7,324,191 B2
(45) Date of Patent: Jan. 29, 2008

(54) OPTICAL SEAT BELT TENSION SENSOR

(75) Inventors: Morgan D. Murphy, Kokomo, IN (US); Henry M. Sanftleben, Carmel, IN (US); Pamela A. Roe, Coopersburg, PA (US)

(73) Assignee: Delphi Technologies, Inc., Troy, MI (US)

( * ) Notice: Subject to any disclaimer, the term of this patent is extended or adjusted under 35 U.S.C. 154(b) by 287 days.

(21) Appl. No.: 11/096,532

(22) Filed: Apr. 1, 2005

(65) Prior Publication Data

US 2006/0219029 A1    Oct. 5, 2006

(51) Int. Cl.
*G01J 1/00*   (2006.01)

(52) U.S. Cl. ........................................... 356/213

(58) Field of Classification Search ............ None
See application file for complete search history.

(56) References Cited

U.S. PATENT DOCUMENTS

| | | | |
|---|---|---|---|
| 5,788,281 A * | 8/1998 | Yanagi et al. ............... | 280/806 |
| 6,554,318 B2 | 4/2003 | Kohut et al. | |
| 6,605,877 B1 | 8/2003 | Patterson et al. | |
| 6,796,192 B2 | 9/2004 | Sullivan et al. | |
| 6,851,503 B2 | 2/2005 | Almaraz et al. | |
| 2003/0226409 A1 * | 12/2003 | Steele et al. ............ | 73/862.391 |
| 2004/0231436 A1 | 11/2004 | Barnabo et al. | |
| 2004/0251366 A1 | 12/2004 | Hishon et al. | |
| 2005/0039965 A1 | 2/2005 | O'Neill | |

FOREIGN PATENT DOCUMENTS

| | | |
|---|---|---|
| DE | 102 40 896 | 3/2004 |
| WO | 99/12012 | 3/1999 |

OTHER PUBLICATIONS

European Search Report dated Jul. 14, 2006.

* cited by examiner

*Primary Examiner*—Michael P. Stafira
(74) *Attorney, Agent, or Firm*—Douglas D. Fekete

(57) ABSTRACT

A belt tension sensor includes an armature that is displaced in relation to belt tension and an optical sensing mechanism that detects armature displacement as a measure of belt tension. In a first mechanization, a lens element is mounted on the armature for movement therewith, and light emitted by a light source passes through the lens element before impinging on a light responsive element; the lens element variably diffuses the emitted light in relation to the belt tension, and the light impinging on the light responsive element provides a measure of the belt tension. In a second mechanization, the armature includes a protuberance that abuts and variably collapses a compressible optical waveguide to vary its optical transmissivity in relation to the armature displacement, and the optical transmissivity of the optical waveguide provides a measure of the belt tension.

6 Claims, 2 Drawing Sheets

OPTICAL SEAT BELT TENSION SENSOR

TECHNICAL FIELD

The present invention relates to an optical sensor for measuring the tension on the seat belt of a vehicle.

BACKGROUND OF THE INVENTION

The tension on a vehicle seat belt can be used to characterize the seat occupant for purposes of determining whether air bags or other restraints should be deployed in a severe crash event. See, for example, the U.S. Pat. Nos. 6,554,318; 6,605,877; 6,796,192; and 6,851,503, assigned to Delphi Technologies, Inc., and incorporated herein by reference. In a typical mechanization, the seat belt passes through a slot in an armature such that the armature is displaced against a spring bias in relation to the belt tension. A switch may be used to detect belt tension in excess of a threshold; or a magnetic sensor can be used to measure the armature displacement, as described in the above-mentioned patents.

SUMMARY OF THE INVENTION

The present invention is directed to an improved belt tension sensor including an armature that is displaced in relation to belt tension, where an optical sensing mechanism detects armature displacement as a measure of belt tension. In a first embodiment of the invention, a refractive lens element is mounted on the armature for movement therewith, and light emitted by a light source passes through the lens element before impinging on a light responsive element; the lens element refracts the emitted light, and the intensity of the light impinging on the light responsive element varies in relation to the belt tension. In a second embodiment, the armature includes a protuberance that abuts and variably collapses a resilient compressible optical waveguide to vary its optical transmissivity in relation to the armature displacement, and light emitter and receiver elements disposed in opposite ends of the waveguide determine the optical transmissivity of the waveguide as an indication of the belt tension.

DESCRIPTION OF THE PREFERRED EMBODIMENT

In general, the present invention is directed to seat belt tension sensors where an armature is displaced in relation to belt tension, and where the armature or an element affixed to the armature varies the optical transmissivity in an optical channel coupling a light emitter to a light receiver. The optical transmissivity is detected as a measure of the armature displacement, which in turn, provides a measure of the belt tension. In a first embodiment of the invention, the optical channel is defined by a cavity in the sensor housing that extends parallel with the armature displacement, and a lens element disposed in the channel and carried by the armature varies the optical transmissivity of the channel. In the second embodiment of the invention, the optical channel is defined by a compressible optical waveguide disposed perpendicular to the armature displacement, and a protuberance of the armature abuts and variably collapses the waveguide to vary the optical transmissivity of the channel.

Figure 1:
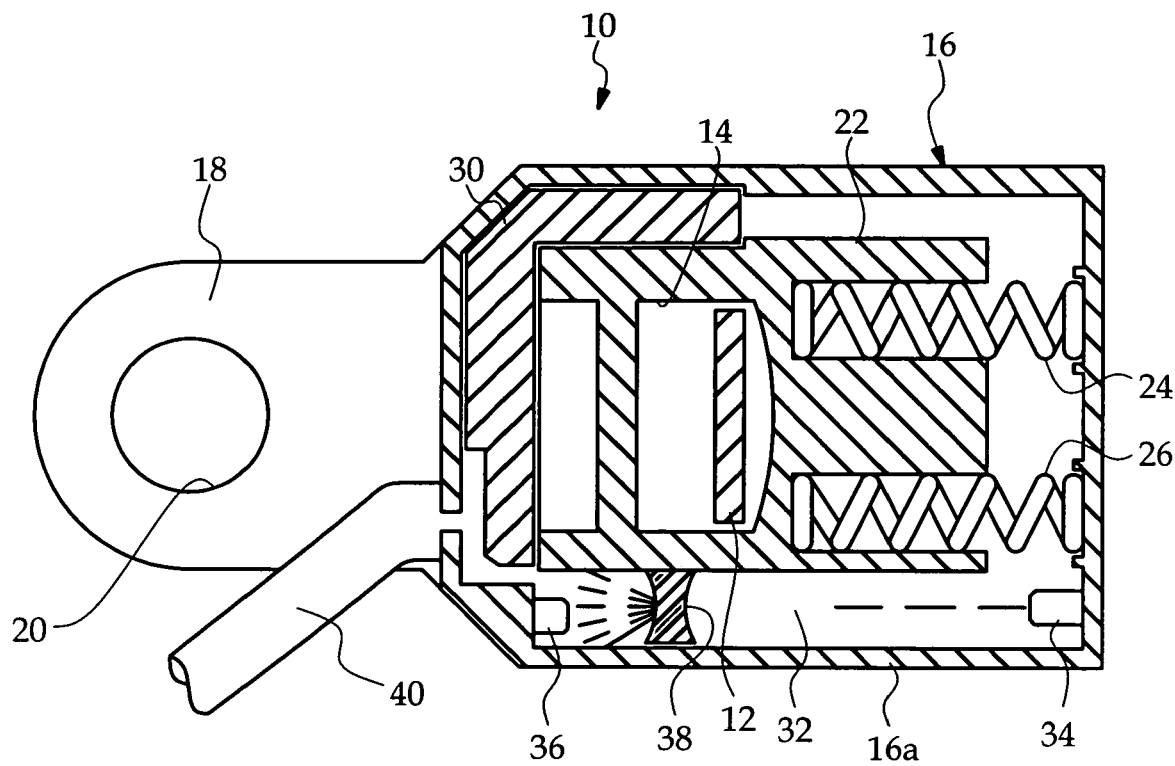
FIG. 1 is a diagram of an optical belt tension sensor according to a first embodiment of this invention.

Referring to FIG. 1, the reference numeral 10 generally designates an optical belt tension sensor according to the first embodiment of this invention. In the illustrated mechanization, the sensor 10 is fastened to the vehicle floor outboard of the seat, and the seat belt 12 passes through a slot 14 in the sensor housing 16. The housing 16 has an integral tang 18 with an opening 20 for fastening sensor 10 to the vehicle floor. When the seat belt 12 is in use, it engages an armature 22 slidably supported within the housing 16, and tension in the seat belt 12 biases armature 22 rightward as viewed in FIG. 1 against the bias force of springs 24 and 26. The rest position of armature 22 is defined by a stop 30.

Figure 3:
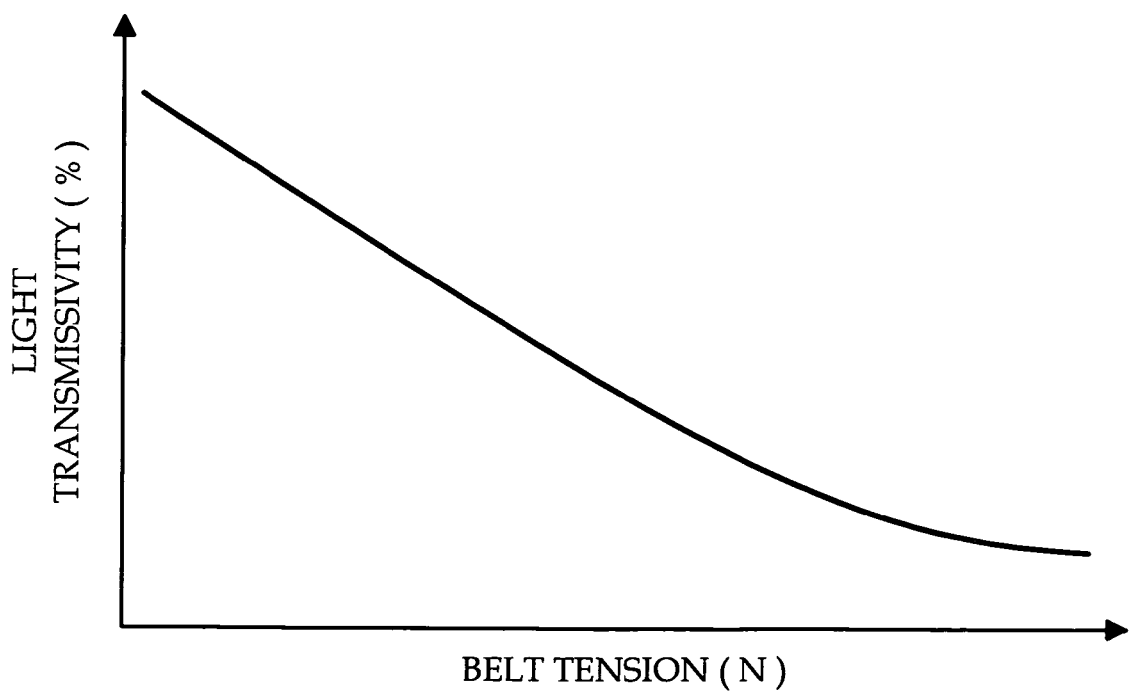
FIG. 3 graphically depicts optical transmissivity in the sensors of FIGS. 1-2 as a function of seat belt tension.

A longitudinal cavity 32 between the armature 22 and a sidewall 16a of housing 16 forms an optical channel for sensing the armature position as an indication of belt tension. A light emitter 34 (a light-emitting-diode, for example) and a light receiver 36 (a photo-diode, for example) are mounted at opposite longitudinal ends of the channel 32, and a refractive lens element 38 affixed to the armature 22 is disposed in the channel 32 between emitter 34 and receiver 36. Light emitted by emitter 34 must be refracted by lens element 38 before impinging on receiver 36, and the longitudinal position of lens element 38 within the channel 32 determines what percentage of the refracted light impinges on receiver 36. When the lens element 38 is close to the receiver 36, most of the light refracted by lens element 38 is detected by receiver 36. As force is applied to the belt 12 to displace armature 22 and lens element 38 rightward as viewed in FIG. 1, the distance between lens element 38 and receiver 36 increases, and proportionately less of the refracted light impinges on receiver 36. In a manner of speaking, the transmissivity of the optical channel 32 is reduced with increasing belt tension, as graphically portrayed in FIG. 3. The receiver 36 produces an output signal indicative of the received light intensity, and such signal is coupled to an electrical cable 40, which also supplies power to the emitter 34.

Figure 2:
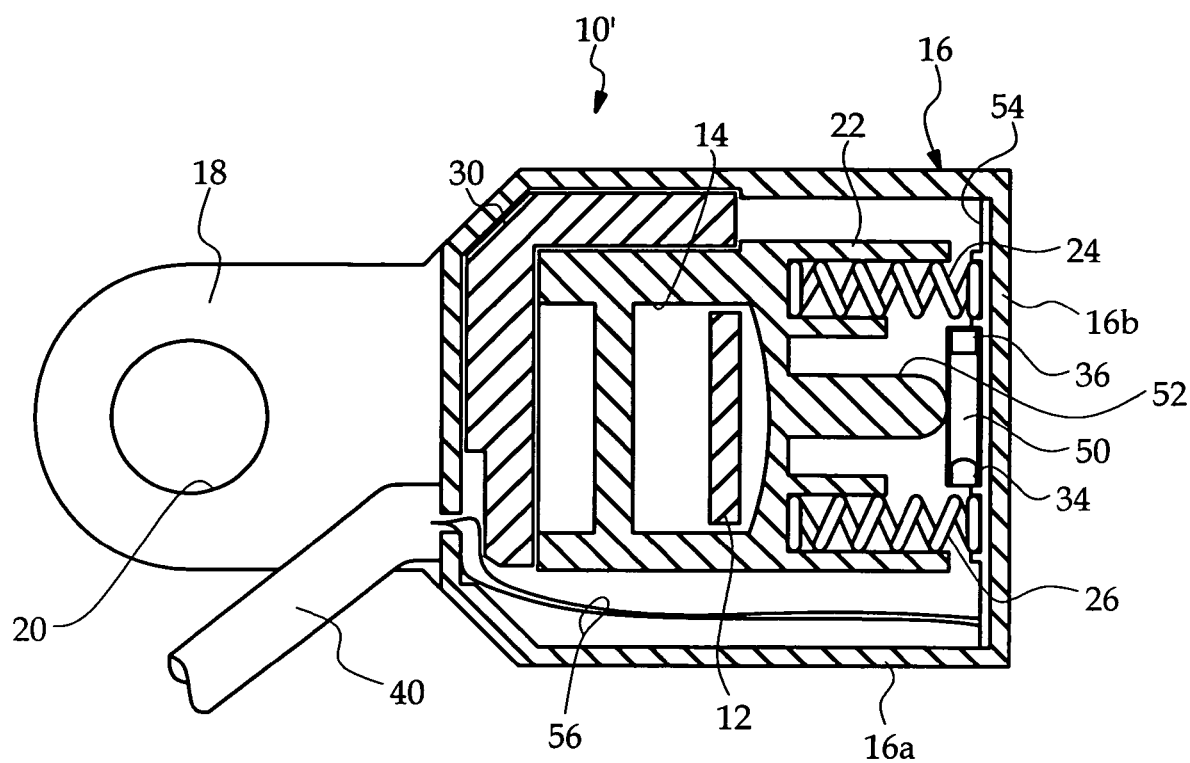
FIG. 2 is a diagram of an optical belt tension sensor according to a second embodiment of this invention.

Referring to FIG. 2, the reference numeral 10' generally designates an optical belt tension sensor according to the second embodiment of this invention. The reference numerals of FIG. 1 have been used in FIG. 2 to designate like elements. In the sensor 10', an optical channel is defined by a resilient compressible optical waveguide 50 formed of hollow or gel-filled silicone tubing, for example. The light emitter 34 and light receiver 36 are disposed in opposite longitudinal ends of the waveguide 50, and the armature 22 includes a centrally disposed protuberance 52 that abuts the waveguide 50 intermediate emitter 34 and receiver 36. In this embodiment, the light emitter 34 and light receiver 36 can alternatively be co-located in one end of the waveguide 50, provided the other end of the waveguide 50 has a highly reflective surface. The waveguide 50 is disposed on a circuit board 54 mounted on the end face 16b of housing 16, and a set of wires 56 couple the circuit board 54 to the electrical cable 40.

When no force is applied to seat belt 12, the springs 24 and 26 bias armature 22 against stop 30, and the optical transmissivity of waveguide 50 is maximized. When force is applied to belt 12, the armature 22 moves rightward as viewed in FIG. 2 against the bias force of springs 24, 26 and any resistance offered by waveguide 50. As the protuberance 52 of armature 22 moves rightward, it partially collapses waveguide 50, reducing its optical transmissivity in relation to the belt tension, as graphically portrayed in FIG. 3. The intensity of light impinging on receiver 36 decreases in relation to the amount by which the optical transmissivity of waveguide 50 is reduced, and the received light intensity provides a measure of the belt tension.

While the present invention has been described with respect to the illustrated embodiments, it is recognized that numerous modifications and variations in addition to those mentioned herein will occur to those skilled in the art. Accordingly, it is intended that the invention not be limited to the disclosed embodiment, but that it have the full scope permitted by the language of the following claims.

The invention claimed is:

1. Apparatus for sensing tension in a seat belt, comprising:
    an armature that is linearly displaced within a housing in relation to seat belt tension;
    an optical channel within said housing;
    means linearly displaced with said armature for varying an optical transmissivity of said optical channel in relation to the seat belt tension; and
    light emitter and light receiver elements disposed in said optical channel for sensing the optical transmissivity of said optical channel as an indication of the seat belt tension.

2. The apparatus of claim 1, where:
    said optical channel is defined by a cavity between said armature and said housing, and extends longitudinally in a direction parallel with the linear displacement of said armature;
    said light emitter element is configured to emit light for reception by said light receiver element; and
    said means includes a refractive lens element disposed in said optical channel between said light emitter element and said light receiver element.

3. The apparatus of claim 2, wherein said light emitter and light receiver elements are supported on said housing.

4. The apparatus of claim 1, where:
    said optical channel is defined by a resilient compressible optical waveguide that extends longitudinally in a direction perpendicular with the linear displacement of said armature;
    said light emitter element is configured to emit light for reception by said light receiver element; and
    said means includes a protuberance that abuts said optical waveguide and that variably collapses said optical waveguide in relation to the seat belt tension.

5. The apparatus of claim 4, wherein said light emitter and light receiver elements are disposed in opposite longitudinal ends of said optical waveguide, and said protuberance abuts said optical waveguide between said light emitter element and said light receiver element.

6. The apparatus of claim 4, wherein said optical waveguide is supported on said housing.

* * * * *